United States Patent
Sugie (10) Patent No.: US 9,693,037 B2
(45) Date of Patent: Jun. 27, 2017

(54) IMAGING APPARATUS HAVING AN IMAGING ELEMENT IN WHICH A PLURALITY OF LIGHT RECEIVING ELEMENTS IS ARRANGED WITH RESPECT TO A MICRO LENS AND METHOD FOR CONTROLLING SAME

(71) Applicant: CANON KABUSHIKI KAISHA, Tokyo (JP)

(72) Inventor: Kazuhiko Sugie, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 553 days.

(21) Appl. No.: 13/744,069

(22) Filed: Jan. 17, 2013

(65) Prior Publication Data
US 2013/0194393 A1    Aug. 1, 2013

(30) Foreign Application Priority Data
Jan. 26, 2012 (JP) ................................. 2012-013868

(51) Int. Cl.
 *H04N 5/232* (2006.01)
 *H04N 13/02* (2006.01)
(52) U.S. Cl.
 CPC ..... *H04N 13/0221* (2013.01); *H04N 5/23212* (2013.01); *H04N 13/0217* (2013.01); *H04N 13/0296* (2013.01)
(58) Field of Classification Search
 CPC .......... H04N 13/0221; H04N 13/0296; H04N 13/0217; H04N 5/23212
 (Continued)

(56) References Cited

U.S. PATENT DOCUMENTS

| 4,410,804 A | 10/1983 | Stauffer |
| 5,864,359 A | 1/1999 | Kazakevich |

(Continued)

FOREIGN PATENT DOCUMENTS

| CN | 1266201 A | 9/2000 |
| CN | 101702076 A | 5/2010 |

(Continued)

OTHER PUBLICATIONS

The above patent documents in this IDS were cited in a Jul. 27, 2015 Chinese Office Action, which is enclosed with an English Translation, that issued in Chinese Patent Application No. 201310033033.1.

(Continued)

*Primary Examiner* — Lin Ye
*Assistant Examiner* — Chan Nguyen
(74) *Attorney, Agent, or Firm* — Cowan, Liebowitz & Latman, P.C.

(57) ABSTRACT

An imaging element is configured by arranging a plurality of light receiving elements with respect to each micro lens. A second PD selecting/composing unit has a mode for generating right-eye image data and left-eye image data from the output signal of the imaging element. A phase difference detecting unit detects a phase difference from right-eye image data and left-eye image data. A movement detecting unit detects the movement of an object from right-eye image data or left-eye image data. A CPU calculates an object position based on both the result of phase difference detection and the result of movement detection and drives a focus lens via a driving unit to thereby control focus adjustment.

8 Claims, 9 Drawing Sheets

(58) Field of Classification Search
USPC .................................................... 348/50, 345
See application file for complete search history.

(56) References Cited

U.S. PATENT DOCUMENTS

| | | | |
|---|---|---|---|
| 6,311,019 B1* | 10/2001 | Ide | 396/95 |
| 8,390,730 B2 | 3/2013 | Takada et al. | |
| 2005/0031330 A1* | 2/2005 | Nonaka et al. | 396/104 |
| 2007/0206937 A1* | 9/2007 | Kusaka | 396/89 |
| 2008/0024614 A1 | 1/2008 | Li et al. | |
| 2008/0205871 A1* | 8/2008 | Utagawa | 396/125 |
| 2011/0018968 A1* | 1/2011 | Shikata et al. | 348/47 |
| 2012/0098936 A1* | 4/2012 | Nonaka | 348/46 |

FOREIGN PATENT DOCUMENTS

| | | |
|---|---|---|
| CN | 101968603 A | 2/2011 |
| JP | 58-024105 | 2/1983 |
| JP | 01-202985 | 8/1989 |
| JP | 2008-028747 | 2/2008 |
| JP | 2010-186004 A | 8/2010 |
| JP | 2011-199502 A | 10/2011 |
| JP | 2012-008370 A | 1/2012 |

OTHER PUBLICATIONS

The above patent documents in this IDS were cited in a Nov. 17, 2015 Japanese Office Action, which is enclosed with an English Translation, that issued in Japanese Patent Application No. 2012013868.

* cited by examiner

FIG. 10

IMAGING APPARATUS HAVING AN IMAGING ELEMENT IN WHICH A PLURALITY OF LIGHT RECEIVING ELEMENTS IS ARRANGED WITH RESPECT TO A MICRO LENS AND METHOD FOR CONTROLLING SAME

BACKGROUND OF THE INVENTION

Field of the Invention

The present invention relates to an imaging apparatus having an imaging element in which a plurality of light receiving elements is arranged with respect to one micro lens and a method for controlling the same.

Description of the Related Art

Conventionally, stereo cameras that are capable of photographing images for three-dimensional display or stereoscopic display have been proposed. Japanese Patent Laid-Open No. 01-202985 discloses an apparatus that acquires a stereo image including a left-eye image and a right-eye image using two optical units and two imaging elements. Japanese Patent Laid-Open No. 58-24105 discloses a method for acquiring left-eye image data and right-eye image data using a single optical unit. Also, a solid-state imaging element having pixels each having a micro lens and a plurality of photodiodes each of which is separated is known. By taking advantage of the fact that each photodiode receives light on a different pupil plane, stereo image data can be acquired.

In addition, digital cameras that display image data captured from an imaging element in real-time (live-view display) such that a user can capture a still picture image while confirming the composition thereof have become popular. For autofocus (hereinafter also referred to as "AF") control during live-view shooting, Japanese Patent Laid-Open No. 2008-028747 discloses a method for continuously performing AF control during live-view shooting while automatically tracking an object designated by a user.

Figure 10:
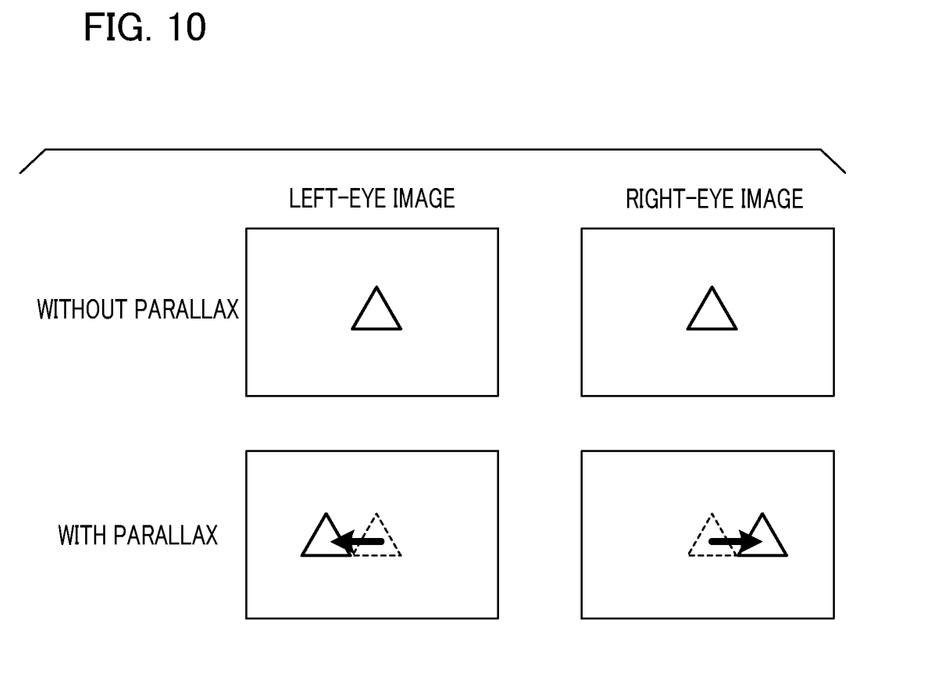
FIG. 10 is a diagram schematically illustrating the movement of an object image in a stereo image.

When an imaging apparatus performs live-view shooting while acquiring a stereo image and automatically tracks an object at the same time, the following circumstance may occur. FIG. 10 is a schematic diagram illustrating parallax-free left-eye and right-eye images on the top side and parallax left-eye and right-eye images on the bottom side, where an object is represented by a triangle. When there is no parallax between the two, the position of an object image is matched between a left-eye image and a right-eye image. However, when there is a parallax between the two, the position of an object image is not matched between a left-eye image and a right-eye image. In particular, when an object moves along a direction of the optical axis of a camera, the each position of the object image for a left-eye image and a right-eye image move in opposite directions as illustrated by the arrows. When an AF operation is continuously performed while tracking an object, AF control may be performed at a position which is displaced from the actual position of the object.

SUMMARY OF THE INVENTION

The imaging apparatus of the present invention acquires left-eye image data and right-eye image data and continuously performs AF control while tracking an object.

According to an aspect of the present invention, an imaging apparatus is provided that includes a sensor that has a plurality of photoelectric conversion units configured to receive and photoelectrically convert light fluxes having passed through an imaging optical system with respect to one micro lens and is capable of outputting first viewpoint image data and second viewpoint image data; a movement detecting unit configured to detect the movement of an object from the first viewpoint image data or the second viewpoint image data; a phase difference detecting unit configured to acquire information corresponding to a phase difference between a first viewpoint image and a second viewpoint image on the basis of the first viewpoint image data and the second viewpoint image data and to acquire information corresponding to a phase difference within a region in response to the movement of the object detected by the movement detecting unit; and a controller configured to control focus adjustment when the phase difference is detected by the phase difference detecting unit.

According to the present invention, an imaging apparatus acquires left-eye image data and right-eye image data and continuously performs AF control while tracking an object may be provided.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings.

First Embodiment

Figure 1:
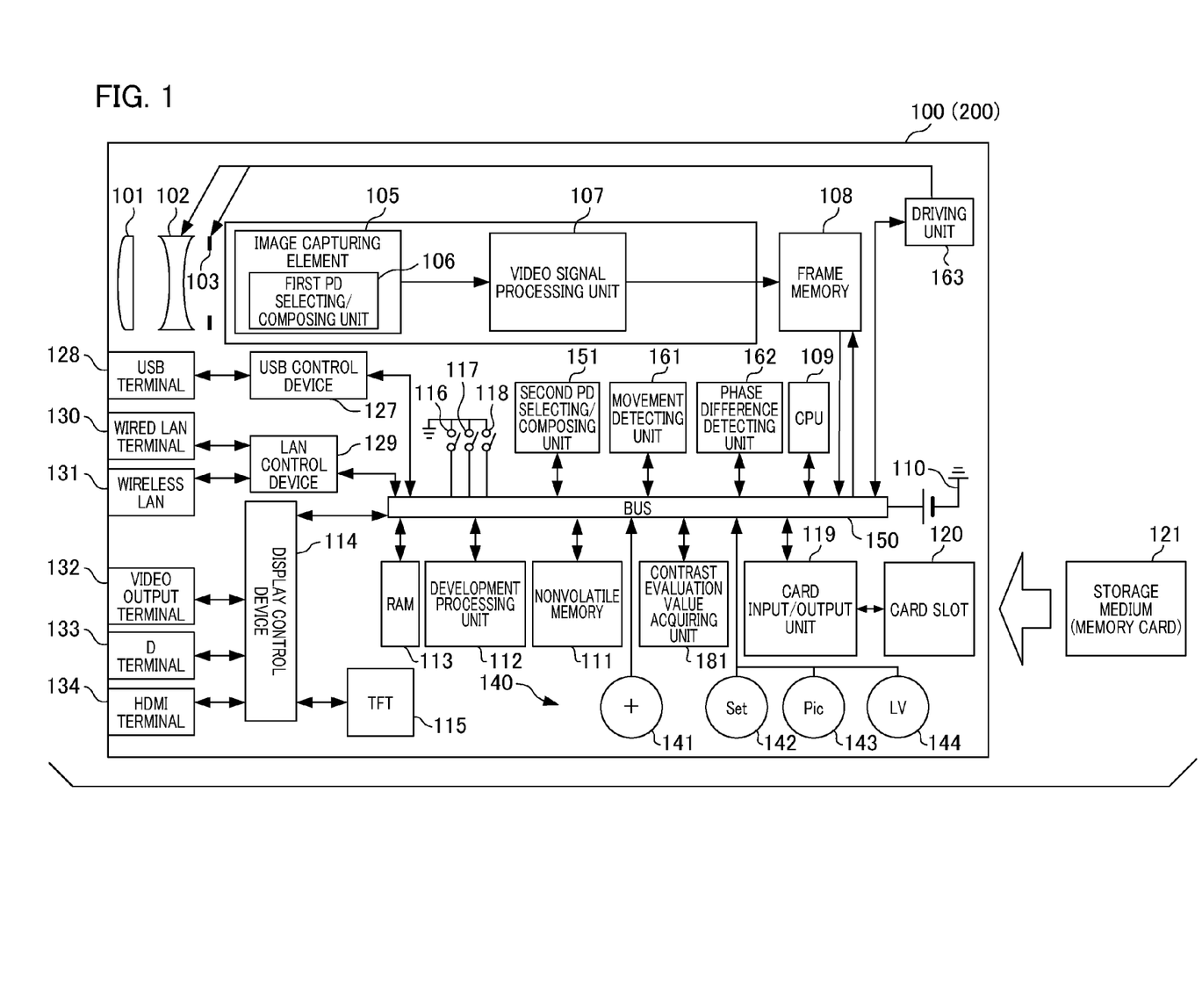
FIG. 1 is a diagram illustrating an exemplary configuration of an imaging apparatus in order to explain a first embodiment of the present invention in conjunction with FIGS. 2 to 8.

FIG. 1 is a diagram schematically illustrating a configuration of an imaging apparatus according to a first embodiment of the present invention. The imaging apparatus of the present embodiment is, for example, a digital camera. The apparatus body 100 includes a lens unit or has a detachable lens apparatus attached thereto.

A CPU (Central Processing Unit) 109 controls the entire imaging apparatus. A power source 110 supplies power to the circuits provided in the apparatus body 100. A card slot 120 is a slot into which a memory card 121 serving as a removable storage medium can be inserted. The memory card 121 is electrically connected to a card input/output unit 119 with the memory card 121 inserted into the card slot 120. Although, in the present embodiment, the memory card 121 is employed as a storage medium, other storage medium such as a hard disk, an optical disk, a magneto-optical disk, a magnetic disk or other solid memory may also be employed.

Among a lens group constituting the lens units, lenses 101 and 102 are only shown in FIG. 1. The lens 102 is a focus lens that performs focus adjustment by being advanced or retracted in a direction along the optical axis. For light incident via a lens group, an aperture 103 adjusts an amount of light to be applied to an imaging element 105. The lens 101, the focus lens 102, and the aperture 103 constitute an imaging optical system. An imaging element 105, a video signal processing unit 107, and a frame memory 108 constitute a photoelectric conversion system. The photoelectric conversion system converts an object image formed by the imaging optical system into a digital image signal or image data.

The imaging element 105 functions as a photoelectric conversion unit that photoelectrically converts an object image formed by the imaging optical system and outputs an image signal. The imaging element 105 is a CCD (Charge Coupled Device) imaging element, a CMOS (Complementary Metal Oxide Semiconductor) imaging element, or the like. The imaging element 105 has an electronic shutter function that can adjust an exposure time. The imaging element 105 may also be constructed to adjust an exposure time using a mechanical shutter instead of the electronic shutter function. A first PD selecting/composing unit 106 provided in the imaging element 105 has functions for selecting a photodiode (hereinafter referred to as "PD") and for composing and outputting an image signal obtained from the selected PD. Note that the first PD selecting/composing unit 106 may also be provided external to the imaging element 105.

Figure 2A:
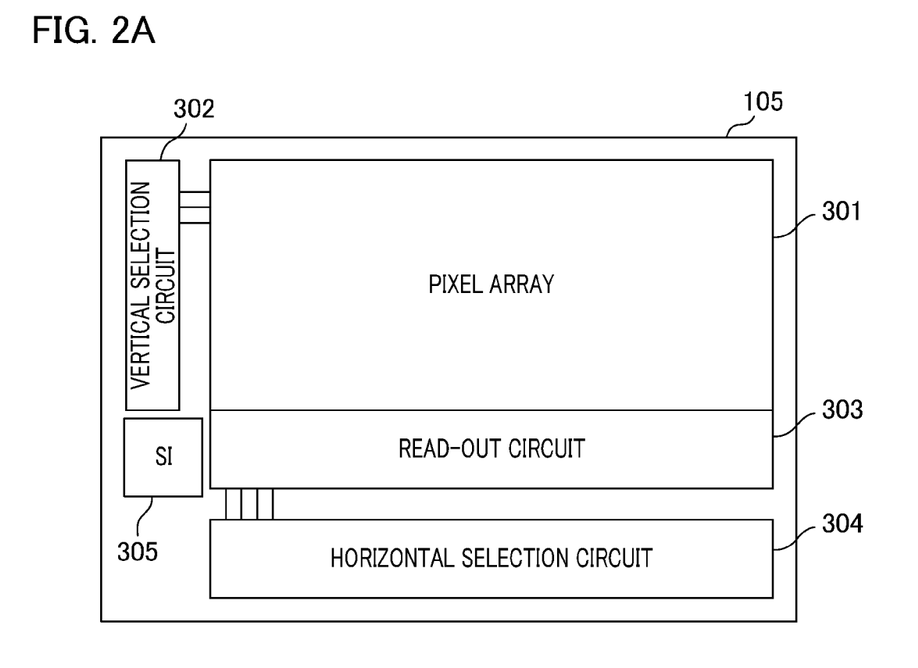
FIGS. 2A and 2B are schematic diagrams illustrating an exemplary configuration of an imaging element.
Figure 2B:
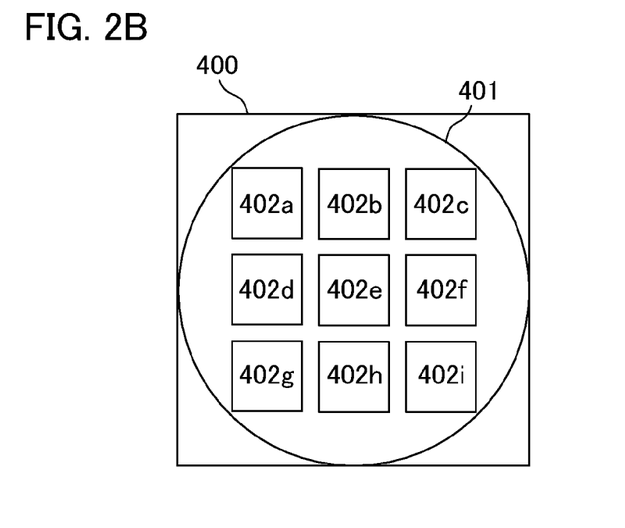

FIGS. 2A and 2B are diagrams schematically illustrating an exemplary configuration of an imaging element which is applied to the imaging apparatus of the present embodiment. FIG. 2A is a diagram illustrating the general configuration of an imaging element. The imaging element 105 includes a pixel array 301, a vertical selection circuit 302 that selects a row in the pixel array 301, and a horizontal selection circuit 304 that selects a column in the pixel array 301. A read-out circuit 303 reads a signal of a pixel portion selected from among the pixel portions in the pixel array 301 by the vertical selection circuit 302. The read-out circuit 303 has a memory for accumulating signals, a gain amplifier, an A (Analog)/D (Digital) converter, or the like for each column.

A serial interface (SI) unit 305 determines the mode of each circuit in accordance with the instructions given by the CPU 109. The vertical selection circuit 302 sequentially selects a plurality of rows of the pixel array 301 so that a pixel signal(s) is extracted to the read-out circuit 303. Also, the horizontal selection circuit 304 sequentially selects a plurality of pixel signals read by the read-out circuit 303 for each row. Note that the imaging element 105 includes a timing generator that provides a timing signal to the vertical selection circuit 302, the horizontal selection circuit 304, the read-out circuit 303, and the like, a control circuit, and the like in addition to the components shown in FIG. 2A, but no detailed description thereof will be given.

FIG. 2B is a diagram illustrating an exemplary configuration of a pixel portion of the imaging element 105. A pixel portion 400 shown in FIG. 2B has a micro lens 401 serving as an optical element and a plurality of PDs 402$a$ to 402$i$ serving as light receiving elements. Each of these PDs functions as a photoelectric conversion unit that receives a light flux and photoelectrically converts the light flux to thereby generate an image signal. Although FIG. 2B shows an example in which the number of PDs provided in one pixel portion is nine, the number of PDs may be any number of two or more. Note that the pixel portion also includes a pixel amplifier for reading a PD signal to the read-out circuit 303, a selection switch for selecting a row, and a reset switch for resetting a PD signal in addition to the components shown in FIG. 2B.

Figure 3:
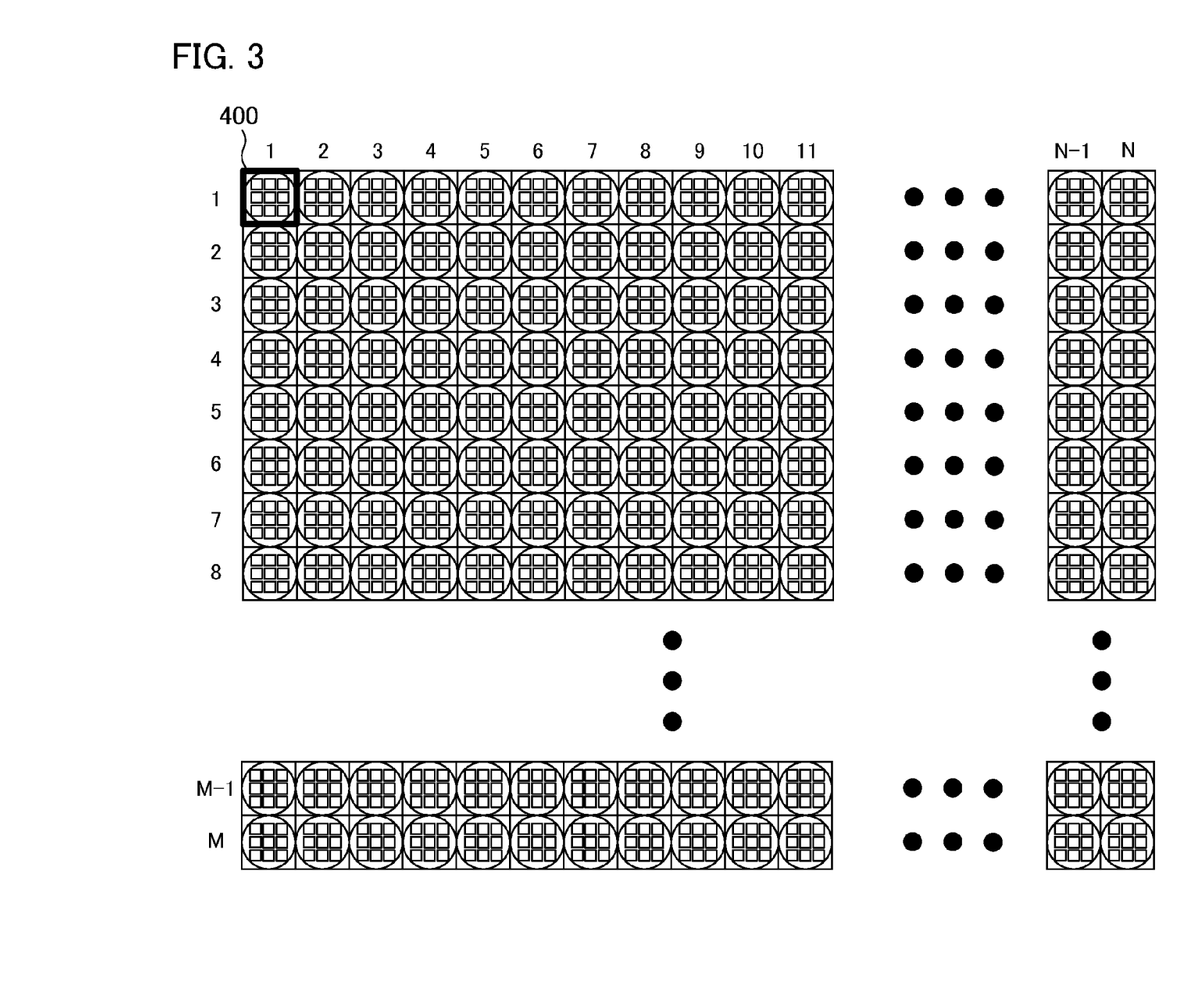
FIG. 3 is a diagram schematically illustrating a pixel array of an imaging element.

FIG. 3 is a diagram illustrating an exemplary pixel array. The pixel array 301 is arranged in a two-dimensional array of "N" pixel portions 400 in the horizontal direction and "M" pixel portions 400 in the vertical direction to provide a two-dimensional image. Each pixel portion 400 has a color filter. For example, an odd row is a repetition of a red (R) and a green (G) color filters, and an even row is a repetition of a green (G) and a blue (B) color filters. In other words, the pixel portions provided in the pixel array 301 are arranged in a predetermined pixel array (in this example, Bayer array).

Figure 4:
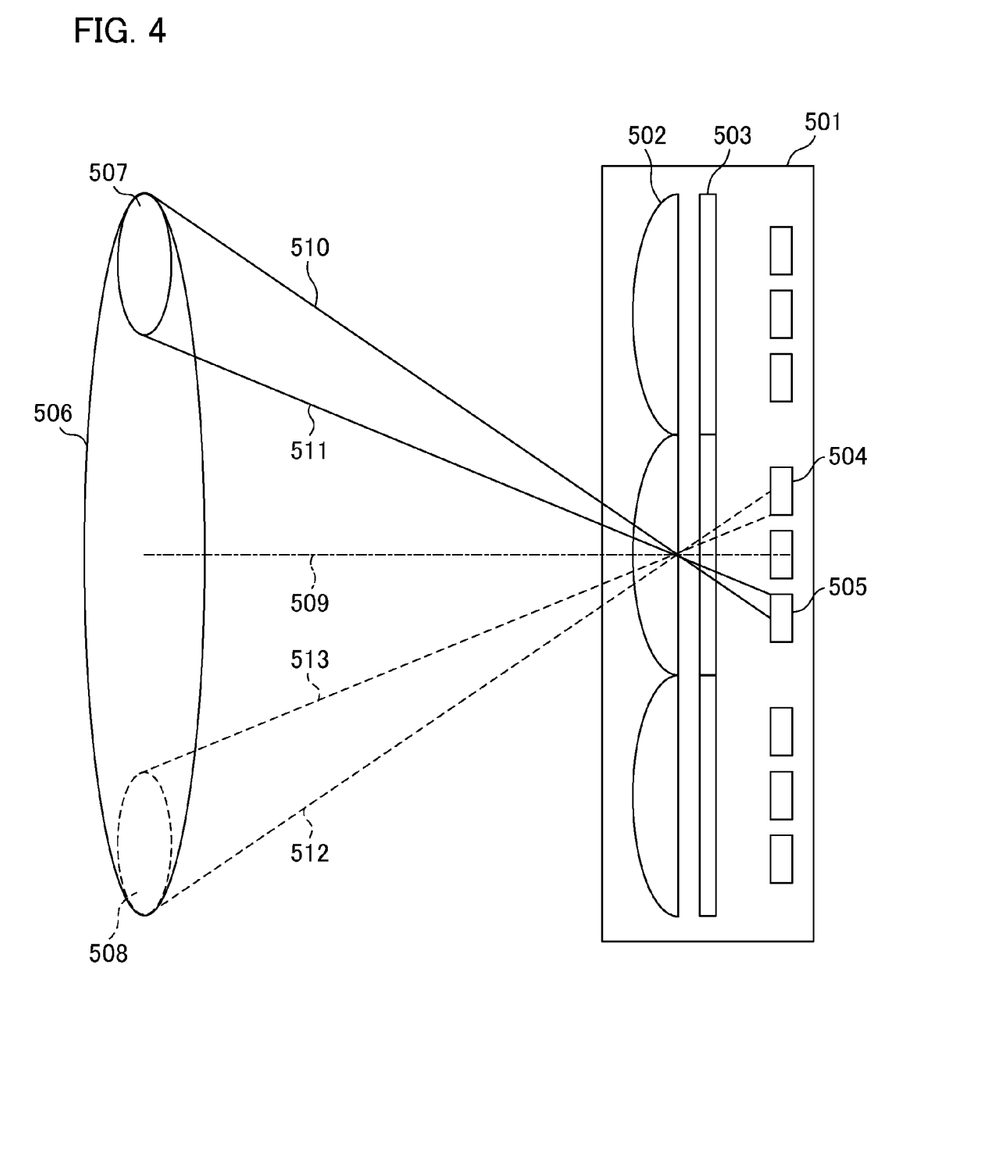
FIG. 4 is a diagram schematically illustrating an imaging relationship of an object.

Next, a description will be given of the light receiving of an imaging element having the pixel configuration shown in FIG. 3. FIG. 4 is a conceptual diagram illustrating how a light flux emitted from the exit pupil of a photographing lens enters the imaging element 105. On a cross-section 501 of three pixel arrays, each pixel array has a micro lens 502, a color filter 503, and PDs 504 and 505. The PD 504 corresponds to the PD 402$a$ shown in FIG. 2B. Also, the PD 505 corresponds to the PD 402$c$ shown in FIG. 2B.

In FIG. 4, an exit pupil 506 of a photographing lens and the center axis of the light flux emitted from an exit pupil 506 to a pixel portion having the micro lens 502 as an optical axis 509 are shown. Light emitted from the exit pupil 506 enters the imaging element 105 centered on the optical axis 509. Partial regions 507 and 508 of the exit pupil 506 are the different divided regions. Light beams 510 and 511 are the outermost peripheral light beams of light passing through the partial region 507. Light beams 512 and 513 are the outermost peripheral light beams of light passing through the partial region 508. Among the light fluxes emitted from the exit pupil 506 shown in FIG. 4, the upper light flux enters the PD 505 and the lower light flux enters the PD 504 with the optical axis 509 as the boundary. In other words, each of the PDs 504 and 505 has properties of receiving light emitted from a different region of the exit pupil 506 of the photographing lens. The imaging apparatus can acquire at least two images with a parallax by making use of such properties. For example, the imaging apparatus sets data obtained from a plurality of left-side PDs and data obtained from a plurality of right-side PDs as a first line and a second line, respectively, in a region in a pixel portion to thereby be able to acquire two images. Then, the imaging apparatus detects a phase difference using the two images to thereby be able to realize a phase difference AF. Furthermore, the imaging apparatus makes use of the two images with a parallax as a left-eye image and a right-eye image to thereby generate a stereo image, whereby the imaging apparatus can display an image having a stereoscopic effect on a stereo display device.

Referring back to FIG. 1, the first PD selecting/composing unit 106 includes a vertical selection circuit 302, a read-out circuit 303, a horizontal selection circuit 304, and an SI unit 305 as described with reference to FIG. 2A. The first PD selecting/composing unit 106 operates in accordance with an operation mode set by the CPU 109. The operation modes include a still picture mode, a normal live-view mode, and a stereo live-view mode which are set depending on the type of shooting of which the start has been detected by the imaging apparatus. In the still picture mode, the first PD selecting/composing unit 106 outputs the outputs of all of the PDs as image data to the video signal processing unit 107. In the normal live-view mode, the first PD selecting/composing unit 106 computes the average of the outputs of all of the PDs provided in a pixel to thereby obtain the results of computation as the output value of the pixel. In the stereo live-view mode, the first PD selecting/composing unit 106 calculates an average value corresponding to the outputs of the PDs 402a, 402d, and 402g shown in FIG. 2B and an average value corresponding to the outputs of the PDs 402c, 402f, and 402i. These average values are the output values of the pixel portion. The outputs of a plurality of PDs are added and combined and the results of computation are treated as one pixel output, whereby the amount of data can be reduced.

In the case of the live-view mode, the amount of data to be output from the imaging element 105 needs to be further reduced in order to increase frame rate. Thus, the first PD selecting/composing unit 106 computes the average of pixels of the same color filter at the position closest to each other to thereby obtain an output value. In the present embodiment, upon live-view, processing for averaging the outputs of three pixels of the same color in the horizontal direction and for reading one pixel for every three pixels in the vertical direction is executed. In this manner, the amount of data can be reduced to one ninth. A specific description will be given of pixels to be used in this case with reference to FIG. 3. In FIG. 3, a pixel on the nth row and mth column is represented by an "n-m pixel portion". The ranges of whole number variables n and m are assumed to be $N \geq n \geq 1$ and $M \geq m \geq 1$, respectively.

For computing the average of the outputs of three pixels in the horizontal direction, the outputs of the first red pixel portions in the first row, i.e., the outputs of 1-1 pixel portion, 1-3 pixel portion, and 1-5 pixel portion are used. The average of the outputs of pixel portions selected in response to the aforementioned mode is computed so that a value for the pixel portions is caluculated. Computation processing is executed for the next red pixel portions, i.e., 1-7 pixel portion, 1-9 pixel portion, and 1-11 pixel portion in the same manner. Computation processing is executed for the first green pixel portions in the first row, i.e., 1-2 pixel portion, 1-4 pixel portion, and 1-6 pixel portion in the same manner. When processing for thinning two pixels in the vertical direction is performed, the next row is the fourth row, and computation processing is executed for the first green pixel portions, i.e., 4-1 pixel portion, 4-3 pixel portion, and 4-5 pixel portion in the same manner. The first blue pixel portions in the fourth row are 4-2 pixel portion, 4-4 pixel portion, and 4-6 pixel portion, and computation processing is executed for these pixels in the same manner.

The video signal processing unit 107 shown in FIG. 1 carries out well known in-camera image signal processing such as shading correction or the like for a digital image signal. The video signal processing unit 107 corrects non-linearity of image density caused by the properties of the imaging element 105 and deviation of image color caused by a light source. The frame memory 108 functions as a buffer memory that temporarily stores image data generated by the imaging element 105 and the video signal processing unit 107. Although image data to be stored in the frame memory 108 has already been subjected to correction processing or the like, image data corresponds to digitized data of charge energy accumulated in the pixel portions of the imaging element 105. Hereinafter, image data stored in the frame memory 108 is referred to as "RAW data". In particular, the RAW data acquired by the first PD selecting/composing unit 106 in the still picture mode is referred to as "all PD-RAW data". Also, the RAW data acquired by the first PD selecting/composing unit 106 in the stereo live-view mode is referred to as "both-eye RAW data". For both-eye RAW data, the average computation is subject to the outputs of PDs provided in each pixel portion in order to increase frame rate. On the other hand, for all PD-RAW data, it is intended to obtain information about image data as detailed as possible in order to treat the data in various types of image processing in later steps. Hence, all PD-RAW data is not subject to selecting processing or composing processing and the data on the basis of output information about the PDs provided in each pixel portion is independently stored in the frame memory 108. A parameter relating to the quality of an image of RAW data is referred to as an "image-capturing parameter". Examples of such an image-capturing parameter include an Av, a shutter speed Tv, and an ISO sensitivity which are the set values for the aperture 103.

A CPU 109, a power source 110, a nonvolatile memory 111, a development processing unit 112, a RAM (Random Access Memory) 113, a display control device 114, and a main switch 116 are connected to a bus 150. The CPU 109 controls reading-out of an image signal from the imaging element 105, and controls the operation timing of the imaging element 105, the video signal processing unit 107, and the frame memory 108. Release switches 117 and 118 that are operated by a user via a release button are also connected to the bus 150. Hereinafter, the first release switch 117 is abbreviated as a first switch and the second release switch 118 is abbreviated as a second switch. The photographing preparation operation is started by the operation of the first switch 117, and the photographing operation is performed by the operation of the second switch 118. In addition, an up-down and right-left selection button 141, a setting button 142, a development parameter change button 143, and a live-view start/end button 144 are exemplified as operation units 140 to be connected to the bus 150. A card input/output unit 119, a second PD selecting/composing unit 151, a movement detecting unit 161, a phase difference detecting unit 162, and an imaging optical system driving unit 163 are further connected to the bus 150. Note that a contrast evaluation value acquiring unit 181 will be described below in a second embodiment.

The nonvolatile memory 111 stores the initial camera set values which are set to a camera when the power source 110 is turned ON by the operation of the main switch 116. The nonvolatile memory 111 is constituted by an EEPROM (Electrically Erasable Programmable Read-Only Memory) or the like so as not to lose the recorded data even if the power source 110 is turned OFF.

The second PD selecting/composing unit 151 performs selecting/composing processing for RAW data in the frame memory 108 or the RAM 113, and stores the processed data in the RAM 113. Also, the second PD selecting/composing unit 151 that constitutes a data processing unit for processing a photographed image has a right-eye selecting/composing mode for generating right-eye image data and a left-eye selecting/composing mode for generating left-eye image data. When the CPU 109 instructs the second PD selecting/composing unit 151 to operate in the right-eye selecting/composing mode, the second PD selecting/composing unit 151 performs processing for selecting the outputs of PDs required for the acquisition of right-eye RAW data from all PD-RAW data or both-eye RAW data and composing the selected outputs of the PDs. When the CPU 109 instructs the second PD selecting/composing unit 151 to operate in the left-eye selecting/composing mode, the second PD selecting/composing unit 151 performs processing for selecting the outputs of PDs required for the acquisition of left-eye RAW data from all PD-RAW data or both-eye RAW data and composing the selected outputs of the PDs. While, in the present embodiment, RAW data is input to the second PD selecting/composing unit 151 via the frame memory 108 or the RAM memory 113, RAW data may also be input directly from the video signal processing unit 107 to the second PD selecting/composing unit 151.

The development processing unit 112 performs image processing for RAW data composed for each pixel, which is stored in the frame memory 108 or the RAM memory 113 read by the CPU 109, based on the development parameter settings. The development parameter is a parameter regarding the image quality of digital image data. Examples of the development parameter include white balance, color interpolation, color correction, γ conversion, edge emphasis, resolution, image compression, and the like of digital image data. Hereinafter, processing for adjusting or changing the image quality of digital image data using one or more development parameters is referred to as "development processing". Image data subjected to development processing is stored in the RAM memory 113 as image data in, for example, YUV422 format or YUV411 format. Also, image data subjected to development processing including compression processing is stored as image data in, for example, JPEG format in the RAM 113, where JPEG is an abbreviation for "Joint Photographic Experts Group". The RAM 113 temporarily stores not only image data obtained as a result of development processing but also data for use when the CPU 109 performs various processing operations.

The display control device 114 drives a TFT (thin film transistor) 115 of a liquid crystal display element and controls a display unit mounted within the imaging apparatus body. Also, the display control device 114 outputs image data arranged in the RAM memory 113 in a display image format to an external display device via a video output terminal 132, a D terminal 133, an HDMI terminal 134, and the like. The RAM memory 113 in which display image data is arranged is referred to as "VRAM". The display device for use in the present embodiment can perform stereoscopic display. In order to perform stereoscopic display, the VRAM includes a right-eye image VRAM and a left-eye image VRAM. The display device arranges right-eye image data in the right-eye image VRAM and left-eye image data in the left-eye image VRAM on a display screen so as to perform stereoscopic display.

A USB control device 127 controls communication between an imaging apparatus and an external device via a USB terminal 128. A LAN control device 129 controls communication between an imaging apparatus and an external device via a wired LAN terminal 130 or a wireless LAN interface unit 131.

Figure 5:
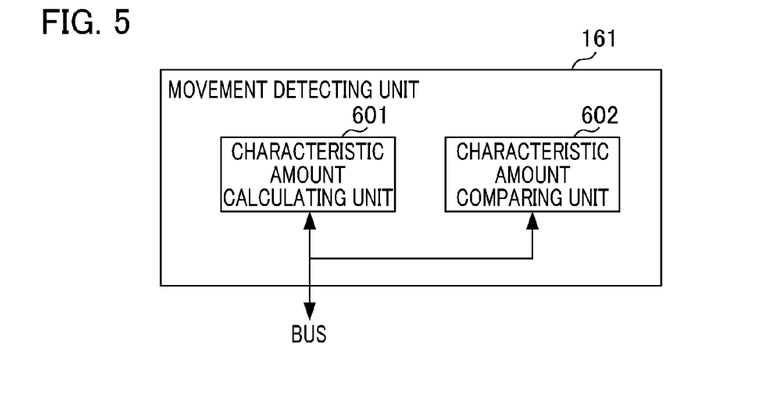
FIG. 5 is a diagram illustrating a configuration of a movement detecting unit.

As shown in FIG. 5, the movement detecting unit 161 is constituted by a characteristic amount calculating unit 601 and a characteristic amount comparing unit 602. The movement detecting unit 161 detects the movement amount of a moving body from the developed image data in the RAM 113. The characteristic amount calculating unit 601 reads left-eye image data or right-eye image data in the RAM 113 to thereby calculate a characteristic amount within an area on the image designated by the CPU 109. For example, the characteristic amount is an integral value or a histogram of an image output within an area. The characteristic amount comparing unit 602 reads information about the characteristic amount calculated in the past and the current image data in the RAM 113 and calculates the coordinates of an image area where the similarity of the characteristic amount is the highest.

Figure 6A:
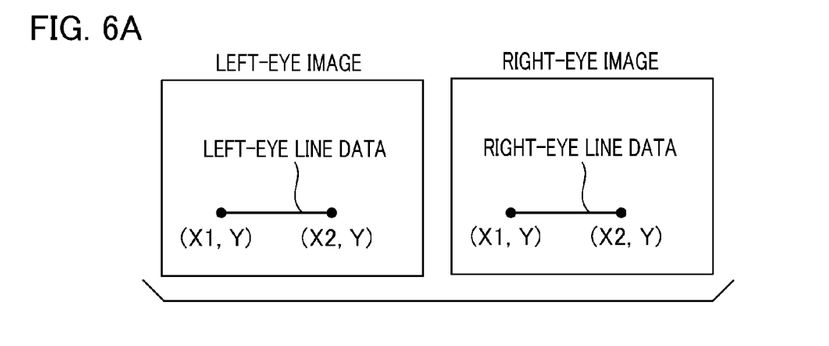
FIGS. 6A to 6C are diagrams schematically illustrating phase difference detection.
Figure 6B:
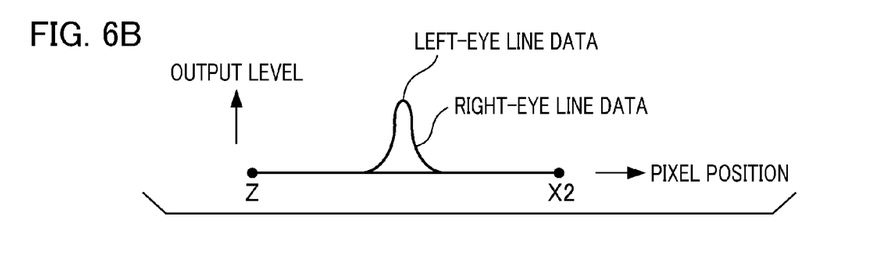
Figure 6C:
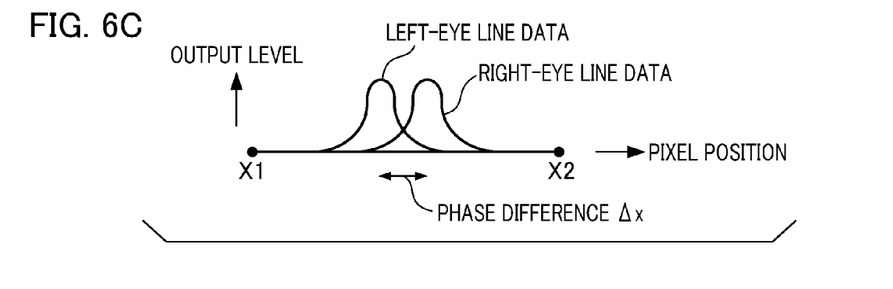

The phase difference detecting unit 162 shown in FIG. 1 detects a phase difference from data of the developed right-eye image and left-eye image on the RAM 113. A description will be given of phase difference detection with reference to FIGS. 6A to 6C. FIG. 6A illustrates the position of line data, which is acquired by the phase difference detecting unit 162, in a left-eye image and a right-eye image. FIGS. 6B and 6C illustrate line data upon imaging from a point light source. FIG. 6B shows a state that an object is in-focus and FIG. 6C shows a state that an object is out of focus, where the pixel position is plotted on the horizontal axis and the output level is plotted on the vertical axis.

Firstly, the phase difference detecting unit 162 extracts first line data and second line data from left-eye image data and right-eye image data based on the line positions (X1, Y) and (X2, Y) designated by the CPU 109, respectively. First line data is image data of a line specified in a left-eye image and second line data is image data of a line specified in a right-eye image. Next, the phase difference detecting unit 162 calculates a phase difference by comparing first line data with second line data. In the case of the focused state shown in FIG. 6B, first line data and second line data overlap with each other. In contrast, in the case of the non-focused state shown in FIG. 6C, a phase difference exists between first line data and second line data, and the pixel positions are displaced from each other. The displacement amount (see Δx) is calculated so that the magnitude of displacement from the focused state is determined. A phase difference is detected by this method, and the driving unit 163 drives the focus lens 102 based on the detection result to thereby control focus adjustment. Note that the driving unit 163 provided in the imaging optical system includes a lens driving unit that drives a movable lens such as the focus lens 102 and an aperture driving unit that drives the aperture 103.

Next, a description will be given of the operation performed by the imaging apparatus. When a user turns the main switch 116 "ON", the CPU 109 executes a predetermined program. When a user turns the main switch 116 "OFF", the CPU 109 executes a predetermined program and puts a camera in a stand-by mode. The first switch 117 is turned "ON" by the first stroke (half-pressed state) of a release button, and the second switch 118 is turned "ON" by the second stroke (full-pressed state) of the release button. When the first switch 117 is turned "ON", the CPU 109 executes photography preparation processing (e.g., focus detection processing or the like). When the second switch 118 is turned "ON", the CPU 109 detects the start of photographing and executes a photographing operation. Hereinafter, the first switch 117 is denoted as a "SW1" and the second switch 118 is denoted as a "SW2".

The CPU 109 performs control depending on the operation state of an imaging apparatus in accordance with the user operation of an up-down and right-left selection button 141 and a setting button 142. For example, a user operates the up-down and right-left selection button 141 and designates an object to be subject to AF during live-view shooting. Furthermore, the user operates the setting button 142 so that the start of the AF operation can be instructed to the apparatus. For the settings of development parameters, the user can confirm and set the development parameters via a graphical user interface by means of the menu operation using the development parameter change button 143. Upon accepting the operation of the live-view start/end button 144, the CPU 109 captures RAW data from the imaging element 105 at regular intervals (e.g., 30 times per 1 sec), and arranges data subjected to development processing in a VRAM. In this manner, an image captured from the imaging element 105 is displayed in real-time. When a user presses the live-view start/end button 144 in a state where the live-view is active, the CPU 109 ends the live-view state.

Next, a description will be given of live-view photographing processing performed by the imaging apparatus according to the first embodiment with reference to the flowcharts shown in FIGS. 7 and 8. The following processes are realized by causing the CPU 109 to execute a predetermined control program.

Figure 7:
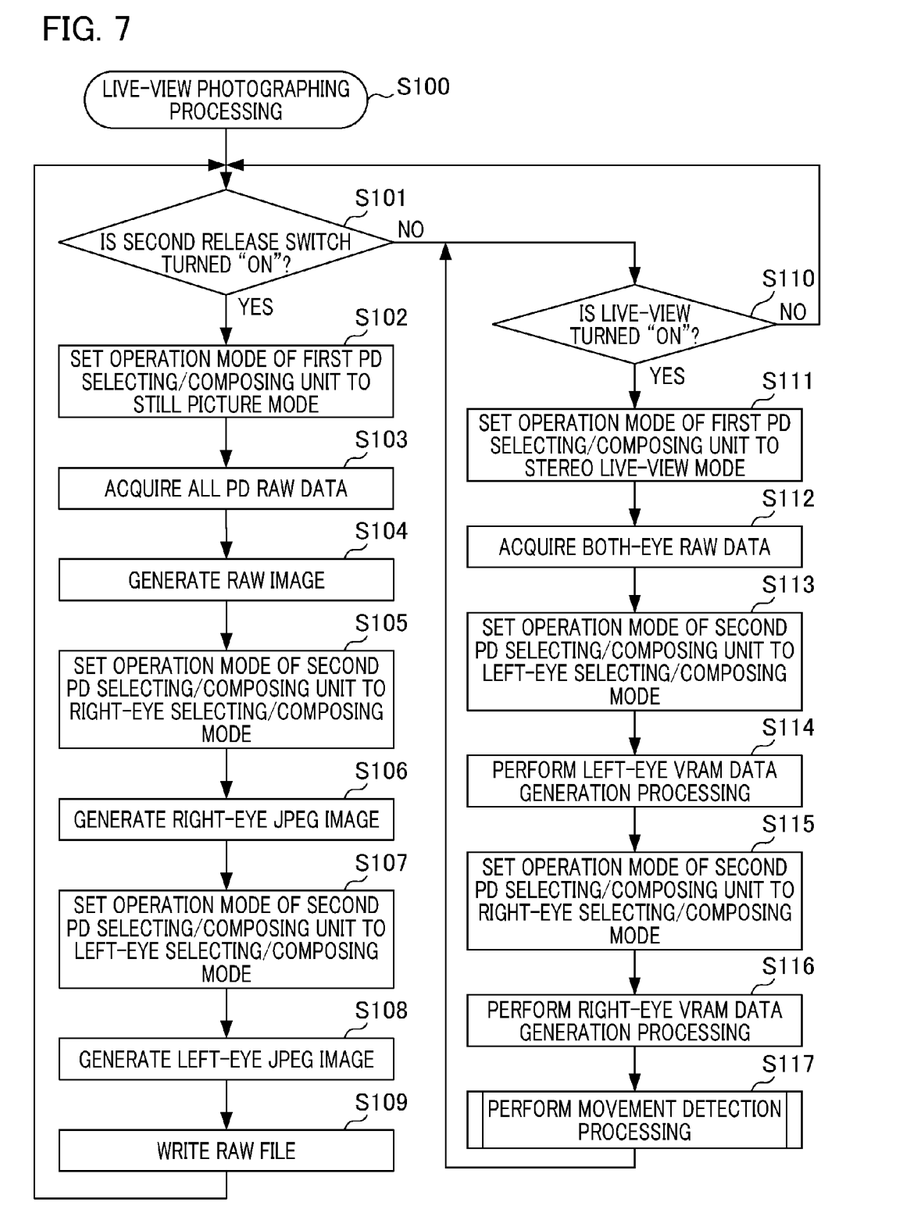
FIG. 7 is a flowchart illustrating an example of live-view photographing processing.

When the process starts in step S100 shown in FIG. 7, the process advances to step S101, and the CPU 109 determines whether the SW2 is in an ON state or OFF state by the operation of the release button. When the SW2 is in an ON state, the process advances to step S102, whereas when the SW2 is in an OFF state, the process advances to step S110. In step S102, the CPU 109 sets the mode of the first PD selecting/composing unit 106 to the still picture mode, and the process advances to step S103. In step S103, a photographing operation starts using the image-capturing parameters at present time, all PD-RAW data is acquired in the frame memory 108, and the process advances to step S104. In step S104, the development processing unit 112 develops all PD RAW data in the frame memory 108 using development parameters for RAW image, and arranges the developed image data in the RAM 113. In step S105, the mode of the second PD selecting/composing unit 151 is set to the right-eye selecting/composing mode, and the process advances to step S106. In step S106, all PD-RAW data in the frame memory 108 is input to the second PD selecting/composing unit 151, and the second PD selecting/composing unit 151 outputs right-eye RAW data to the RAM 113. Furthermore, the development processing unit 112 develops right-eye RAW data in the RAM 113 using development parameters for JPEG image, and arranges the developed image data in the RAM 113. Then, the process advances to step S107.

In step S107, the CPU 109 sets the mode of the second PD selecting/composing unit 151 to the left-eye selecting/composing mode, and the process advances to step S108. In step S108, all PD-RAW data in the frame memory 108 is input to the second PD selecting/composing unit 151, and the second PD selecting/composing unit 151 outputs left-eye RAW data to the RAM 113. Furthermore, the development processing unit 112 develops left-eye RAW data in the RAM 113 using development parameters for JPEG image, and arranges the developed image data in the RAM 113. Then, the process advances to step S109. In step S109, a single file in accordance with the Exif standard is generated from the RAW image data generated in step S104, the right-eye JPEG image data generated in step S106, and the left-eye JPEG image data generated in step S108. The file is stored in the memory card 121 via the card input/output unit 119. The Exif standard is an image file format standard for digital still camera.

When the process advances from step S101 to step S110, the CPU 109 determines whether or not the live-view start/end button 144 has been operated in a state where the live-view is not started. When the CPU 109 determines that the live-view start/end button 144 is in an ON state, the process advances to step S111, whereas when the CPU 109 determines that the live-view start/end button 144 is in an OFF state, the process returns to step S101. Also, when the live-view start/end button 144 has been operated to be in an ON state in a state where the live-view is started, the process returns to step S101, whereas when the live-view start/end button 144 has not been operated, the process advances to step S111.

In step S111, the CPU 109 sets the mode of the first PD selecting/composing unit 106 to the stereo live-view mode, and the process advances to step S112. For the pixel output in the stereo live-view mode, the average of the outputs of the PDs 402a, 402d, and 402g is computed so that right-eye image data in FIG. 2B is generated. Also, the average of the outputs of the PDs 402c, 402f, and 402i is computed so that left-eye image data is generated. These two values are the pixel output values. As described above, the outputs of a plurality of PDs are combined to thereby obtain the resulting two values as pixel output values, whereby the amount of data can be reduced. In step S112, a photographing operation starts using the image-capturing parameters for live-view, and both-eye RAW data is acquired in the frame memory 108. In step S113, the mode of the second PD selecting/composing unit 151 is set to the left-eye selecting/composing mode, and the process advances to step S114. In step S114, both-eye RAW data in the frame memory 108 is input to the second PD selecting/composing unit 151, and thus, left-eye RAW data acquired by the second PD selecting/composing unit 151 is input in the RAM 113. Furthermore, the development processing unit 112 develops left-eye RAW data using the development parameters for display, and arranges the developed image data in a left-eye VRAM. In step S115, the mode of the second PD selecting/composing unit 151 is set to the right-eye selecting/composing mode, and the process advances to step S116. In step S116, right-eye RAW data is acquired by the second PD selecting/composing unit 151 in the frame memory 108, and the development processing unit 112 develops right-eye RAW data using the development parameters for display, and arranges the developed image data in a right-eye VRAM. In step S117, movement detection processing is performed, and the process returns to step S110.

Next, a description will be given of movement detection processing in step S117 with reference to the flowchart shown in FIG. 8. In step S200, movement detection processing starts. In step S201, the CPU 109 determines whether or not the movement detection mode is ON. When the movement detection mode is OFF as a result of determination, the process advances to step S202, and the CPU 109 determines whether or not an object position is designated. For designating an object position, the CPU 109 determines the user operation input using the up-down and right-left selection button 141 and the setting button 142. When no object position is designated, the process advances to step S203, and the movement detection processing ends. On the other hand, when the CPU 109 determines in step S202 that an object position is designated, the process advances to step S204.

In step S204, the CPU 109 sets the movement detection mode to "ON", and stores data indicating the center coordinates of the designated object position in a memory. Hereinafter, the two-dimensional coordinate axes to be set on a photographing screen are defined as the x axis and the y axis, and the center coordinates of the designated object position are $(x_T, y_T)$. In step S205, the CPU 109 designates the end points of the detection line, i.e., $(x_T-a, y_T)$ and $(x_T+a, y_T)$ to the phase difference detecting unit 162. Although any value may be set as the value of a, far-and-near competition may occur if the value of a is an extremely large value, and thus, it is preferable that the value of a is about ¼ of the number of horizontal pixels in an image. The phase difference detecting unit 162 calculates a phase difference Δx by comparing the designated line position of the developed left-eye image data with that of the developed right-eye image data. The CPU 109 calculates the center coordinates ($x_L$, $y_L$) of the object in the left-eye image as follows using the obtained Δx:

$$(x_L, y_L) = (x_T + \Delta x/2, y_T)$$

The coordinate data is stored in a memory, and the process advances to step S206.

In step S206, the CPU 109 designates a rectangular area about the center coordinates ($x_L$, $y_L$) of the object in the left-eye image to the movement detecting unit 161. Next, the movement detecting unit 161 detects the characteristic amount of the object in the rectangular area designated on the left-eye image and stores the characteristic amount of the object in a memory. In step S207, the CPU 109 calculates a lens driving amount to the focused position using the phase difference Δx calculated in step S205, and instructs the lens driving unit of the driving unit 163 to drive the focus lens 102. Focus adjustment is controlled by moving the focus lens 102, and the process advances to step S203.

When the CPU 109 determines in step S201 that the movement detection mode is ON, the process advances to step S208. In step S208, the CPU 109 notifies the movement detecting unit 161 of the characteristic amount of the object and the center coordinates ($x_L$, $y_L$) of the object, which have been updated in the past, in the left-eye image. The movement detecting unit 161 reads left-eye image data to thereby calculate an object movement amount (Δu, Δv). The symbol Δu denotes the amount of change in position of an object image in the x-axial direction, and the symbol Δv denotes the amount of change in position of an object image in the y-axial direction. In this manner, the movement detecting unit 161 detects the movement of the object by detecting a movement amount at a field angle of a predetermined object image. The process advances to step S209, and the CPU 109 determines whether or not movement detection was successfully made based on the object movement amount (Δu, Δv). When an object moves vigorously or when an object moves outside a field angle, it becomes difficult to achieve movement detection. Thus, the upper limit is set to the object movement amount. When the components of (Δu, Δv) exceed a threshold value corresponding to the upper limit, the CPU 109 determines that the result of correct/incorrect determination for movement detection is NG, and the process advances to step S210. In step S210, the CPU 109 sets the movement detection mode to OFF, and the process advances to step S203.

On the other hand, when the components of the object movement amount (Δu, Δv) are equal to or less than a threshold value in step S209, the CPU 109 determines that movement detection was successfully made (see "OK"), and the process advances to step S211. In step S211, the CPU 109 updates the center coordinates of the object in the left-eye image from the object movement amount (Δu, Δv) as follow:

$$(x_L, y_L) = (x_L + \Delta u, y_L + \Delta v)$$

The center coordinates of the object are values after movement by adding the object movement amount (Δu, Δv) to the coordinates of the original position of the object. Furthermore, the CPU 109 instructs the movement detecting unit 161 to calculate the characteristic amount of the object at the updated coordinates ($x_L$, $y_L$) to thereby update data for the obtained characteristic amount of the object. Then, the process advances to step S212. In step S212, the CPU 109 designates the end points of the detection line, i.e., ($x_L$−a, $y_L$) and ($x_L$+a, $y_L$) to the phase difference detecting unit 162. The reason why $y_L$ is used as the y-axis component is that the object position is matched between the left-eye image and the right-eye image in the vertical direction. The phase difference detecting unit 162 calculates a phase difference Δx by comparing the designated line position of left-eye image data with that of right-eye image data, and the process advances to step S213.

In step S213, the CPU 109 calculates the center coordinates of the object ($x_T$, $y_T$) using the obtained phase difference Δx as follows:

$$(x_T, y_T) = (x_L + \Delta x/2, y_L)$$

The coordinate data is stored in a memory, and the process advances to step S214. In step S214, the CPU 109 determines the presence or absence of the phase difference. Here, the presence or absence of the phase difference may be determined whether or not Δx is zero or the presence of the phase difference may be determined when Δx exceeds a predetermined threshold value. For example, the phase difference is a second case where the phase difference is less than a case where the CPU 109 determines that the phase difference is present and the phase difference is in a first case), the CPU 109 does not control focus adjustment. Also, Δx data may be held over a plurality of frames and determine the presence or absence of the phase difference from the results of a plurality of Δxs. When the CPU 109 determines in step S214 that there is a phase difference, the process advances to step S207, whereas when the CPU 109 determines in step S214 that there is no phase difference, the process advances to step S203.

While the aforementioned movement detection processing is performed on the basis of the left-eye image, the same processing may also be performed on the basis of the right-eye image. As described above, according to the first embodiment, a continuous AF operation can be realized by use of movement detection when a stereoscopic display is performed during live-view shooting.

Second Embodiment

Next, a description will be given of a second embodiment of the present invention. Explanation of the components shown in FIG. 1 described in the first embodiment will be omitted. Hereinafter, a description will be given of the differences from the first embodiment.

An imaging apparatus 200 includes a contrast evaluation value acquiring unit 181 connected to the bus 150. The contrast evaluation value acquiring unit 181 reads left-eye image data or right-eye image data in the RAM 113 to thereby calculate a contrast evaluation value within an area on the image designated by the CPU 109. The contrast evaluation value is calculated by the ratio between the maximum value and the minimum value of the image output and is characterized in that the evaluation value is increased with respect to an image near the focus point.

Figure 9:
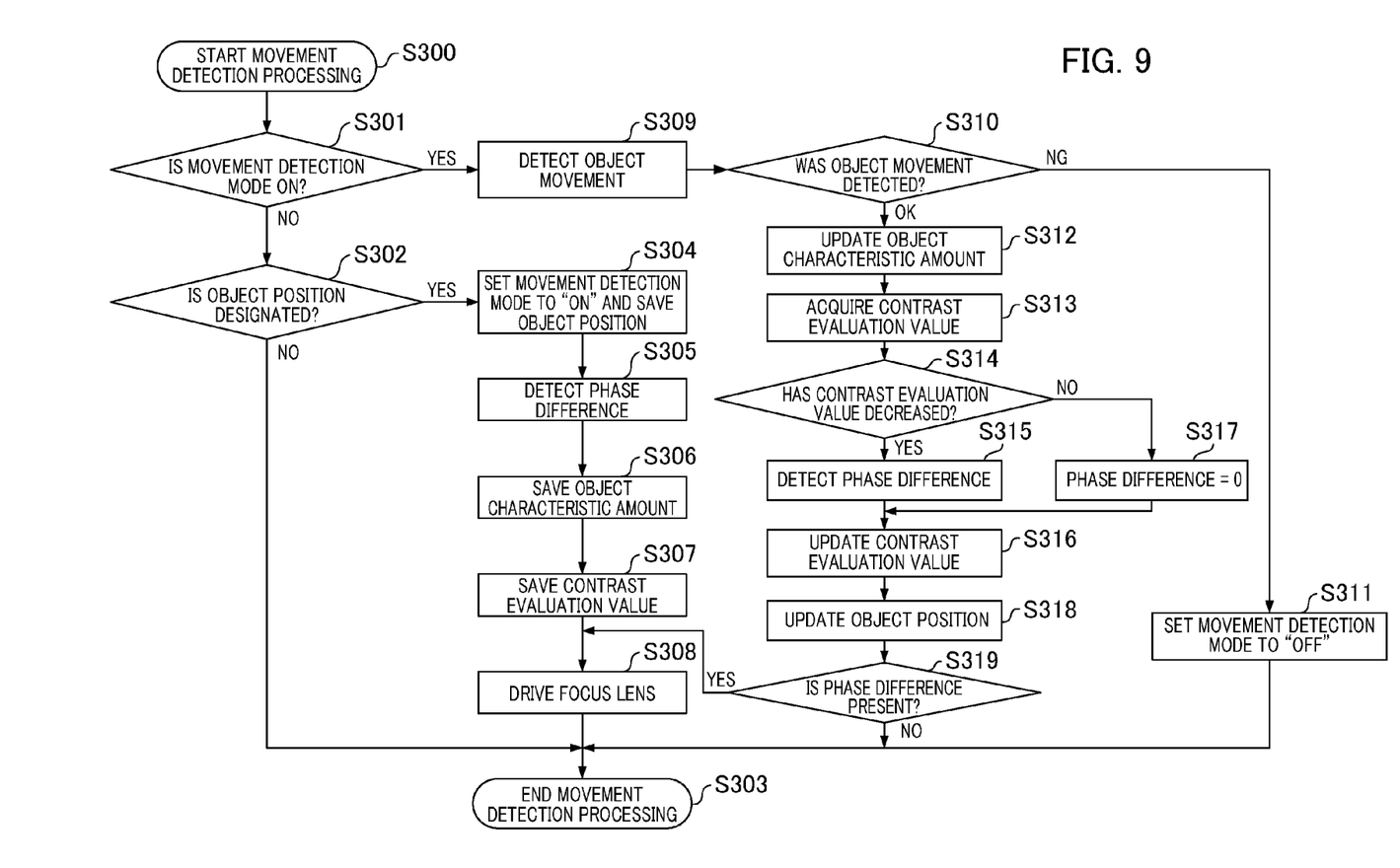
FIG. 9 is a flowchart illustrating an example of movement detection processing according to a second embodiment of the present invention.

Hereinafter, a description will be given of live-view photographing processing performed by the imaging apparatus 200 with reference to FIG. 7 and FIG. 9. Since the processes from step S100 to step S116 shown in FIG. 7 are the same as those in the first embodiment, a description will be given of movement detection processing shown in step S117 with reference to FIG. 9.

In step S300, movement detection processing starts, and the process advances to step S301. The processes from step S301 to step S306 are the same as those from step S201 to step S206 shown in FIG. 8, and explanation thereof will be omitted.

In step S307, the CPU 109 designates a rectangular area about the center coordinates of the object ($x_L$, $y_L$) in the left-eye image to the contrast evaluation value acquiring unit 181. Next, the contrast evaluation value acquiring unit 181 calculates the contrast evaluation value for the object image in the rectangular area designated on the left-eye image and stores the calculated contrast evaluation value in a memory. Then, the process advances to step S308. In step S308, the CPU 109 calculates a lens driving amount to the focused position using the phase difference $\Delta x$ calculated in step S305, and instructs the lens driving unit of the driving unit 163 to drive the focus lens 102. Then, the process advances to step S303, and movement detection processing ends.

Figure 8:
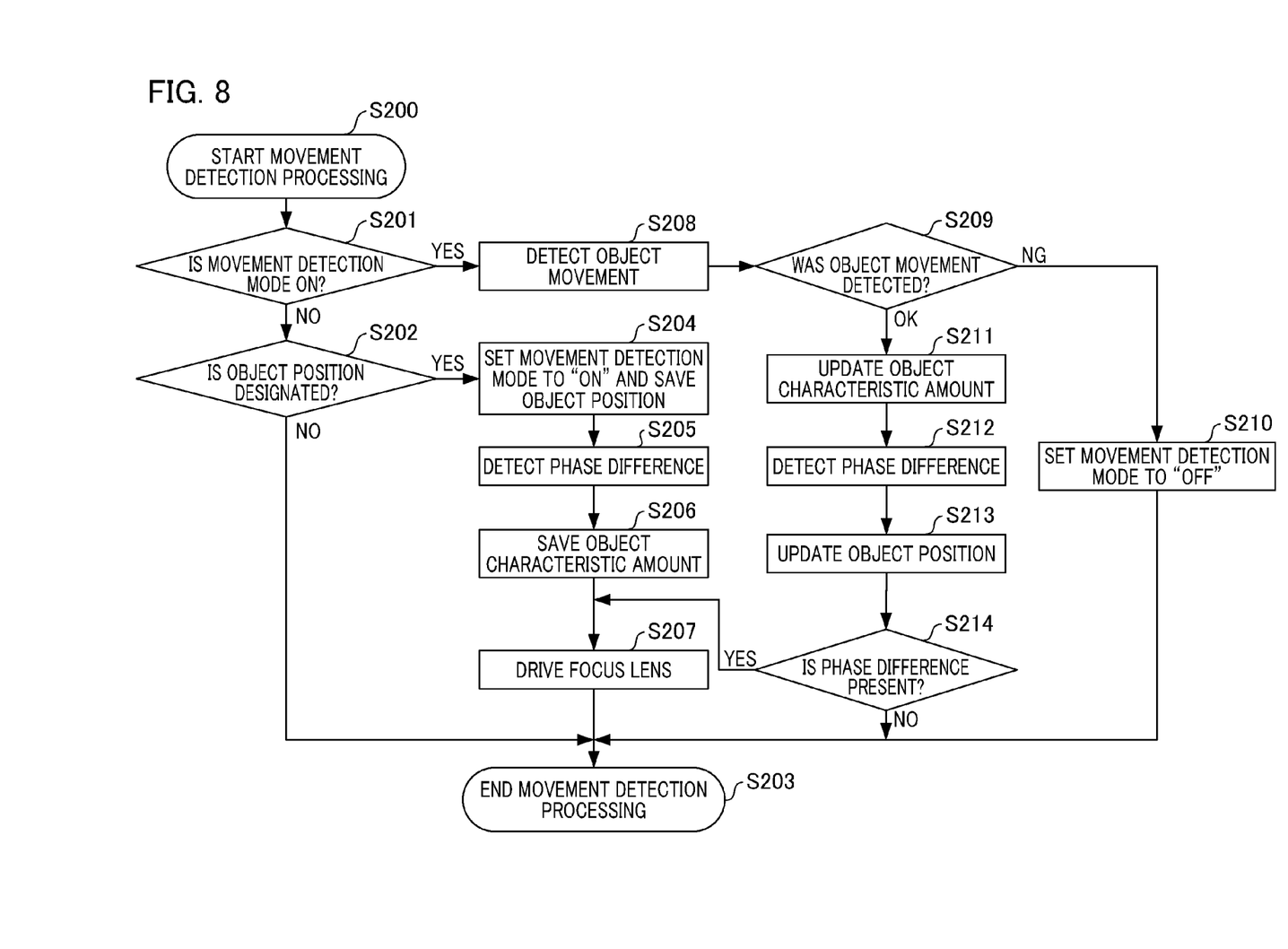
FIG. 8 is a flowchart illustrating an example of movement detection processing.

The processes from step S309 to step S312 are the same as those from step S208 to step S211 shown in FIG. 8, and explanation thereof will be omitted. In step S313, the CPU 109 designates a rectangular area about the center coordinates of the object ($x_L$, $y_L$) in the left-eye image to the contrast evaluation value acquiring unit 181. Next, the contrast evaluation value acquiring unit 181 calculates the contrast evaluation value for the object image in the rectangular area designated on the left-eye image, and the process advances to step S314. In step S314, the CPU 109 compares the contrast evaluation value calculated in step S313 with the contrast evaluation value stored in the past. When the current contrast evaluation value is lowered compared with the past contrast evaluation value, the process advances to step S315. In step S315, the CPU 109 designates the end points of the detection line, i.e., ($x_L-a$, $y_L$) and ($x_L+a$, $y_L$) to the phase difference detecting unit 162. The phase difference detecting unit 162 calculates a phase difference $\Delta x$ by comparing the designated line position of left-eye image data with that of right-eye image data, and the process advances to step S316. In step S316, the CPU 109 stores the contrast evaluation value acquired in step S313 in a memory and updates the contrast evaluation value by overwriting the contrast evaluation value acquired in the past with the current value. Then, the process advances to step S318.

On the other hand, when the current contrast evaluation value is not lowered compared with the past contrast evaluation value in step S314, the process advances to step S317. The fact that the contrast evaluation value is not lowered means that the object is not moving in the optical axial direction. In other words, phase difference detection processing may not be performed. Thus, in step S317, the phase difference $\Delta x$ is set to zero and is then stored in a memory without performing phase difference detection processing, and the process advances to step S316. The processes in steps S318 and S319 are the same as those in steps S213 and S214 shown in FIG. 8.

In the second embodiment, in addition to the effects of the first embodiment, unnecessary phase difference detection processing can be omitted by the continuous monitoring of the contrast evaluation value. When it is determined during movement detection processing that the contrast evaluation value is not lowered, the necessity of phase difference detection processing is eliminated, whereby the processing load on the CPU 109 and the access frequency to the RAM 113 can be reduced.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-013868 filed on Jan. 26, 2012, which is hereby incorporated by reference herein in its entirety.

What is claimed is:

1. An imaging apparatus comprising:
a sensor that has a plurality of photoelectric conversion units configured to receive and photoelectrically convert light fluxes having passed through an imaging optical system with respect to one micro lens and is capable of outputting first viewpoint image data and second viewpoint image data;
a movement detecting processor configured to detect the movement of an object by calculating first statistics of each of a plurality of the first viewpoint image data and comparing the first statistics or calculating second statistics of each of a plurality of the second viewpoint image data and comparing the second statistics;
a phase difference detecting processor configured to acquire information corresponding to a phase difference between a first viewpoint image and a second viewpoint image by comparing the first viewpoint image and the second viewpoint image; and
a controller configured to control focus adjustment based on the phase difference detected by the phase difference detecting processor,
wherein, in a case where the movement is detected by the movement detecting processor, the phase difference detecting processor compares the first viewpoint image and the second viewpoint image in a region restricted by each region of the first viewpoint image and the second viewpoint image in which the movement is detected by the movement detecting processor,
wherein the movement detecting processor detects the movement of an object in a case where the movement of the object is equal to or less than a threshold value, and
wherein, when a movement amount of an object detected by the movement detecting processor is equal to or less than a threshold value, the controller calculates center coordinates of an object position on a first viewpoint image or a second viewpoint image from the movement amount and instructs the movement detecting processor to calculate an characteristic amount of the object on the center coordinates.

2. The imaging apparatus according to claim 1, wherein the controller controls focus adjustment in a case where the movement of the object is detected by the movement detecting processor and the phase difference is detected by the phase difference detecting processor.

3. The imaging apparatus according to claim 1, wherein the controller controls focus adjustment in a case where the movement of the object is detected by the movement detecting processor and the phase difference is a first case, whereas the controller does not control focus adjustment when the movement of the object is detected by the movement detecting processor and the phase difference is a second case where the phase difference is less than the first case.

4. The imaging apparatus according to claim 1, further comprising:
   a display unit configured to display image data acquired by the sensor.

5. The imaging apparatus according to claim 1, wherein the movement of the object to be detected by the movement detecting processor is obtained by detecting a movement amount at a field angle of a predetermined object image.

6. The imaging apparatus according to claim 1, wherein the controller performs stereoscopic display using the first viewpoint image data and the second viewpoint image data.

7. The imaging apparatus according to claim 1, wherein the controller designates a detection line for the first viewpoint image data and the second viewpoint image data to the phase difference detecting processor, the phase difference detecting processor detects a phase difference by comparing image data at the position of the designated detection line, and the controller calculates an object position using the detected phase difference.

8. A control method executed by an imaging apparatus that is capable of performing a photographing operation while displaying image data acquired by a sensor having a plurality of photoelectric conversion units configured to receive and photoelectrically convert light fluxes having passed through an imaging optical system with respect to one micro lens, the method comprising:
   detecting the movement of an object by calculating first statistics of each of a plurality of the first viewpoint image data and comparing the first statistics or calculating second statistics of each of a plurality of the second viewpoint image data and comparing the second statistics;
   acquiring information corresponding to a phase difference between a first viewpoint image and a second viewpoint image by comparing the first viewpoint image and the second viewpoint image; and
   controlling focus adjustment based on the phase difference detected,
   wherein, in a case where the movement is detected, the first viewpoint image and the second viewpoint image is compared in a region restricted by each region of the first viewpoint image and the second viewpoint image in which the movement is detected,
   wherein the movement of an object is detected in a case where the movement of the object is equal to or less than a threshold value, and
   wherein, when a detected movement amount of an object is equal to or less than a threshold value, center coordinates of an object position is calculated on a first viewpoint image or a second viewpoint image from the movement amount and an characteristic amount of the object is calculated on the center coordinates.

* * * * *